United States Patent
Chang et al.

(10) Patent No.: US 7,826,326 B2
(45) Date of Patent: Nov. 2, 2010

(54) DATA READING METHOD

(75) Inventors: Chia-Yen Chang, Hsinchu (TW); Yueh-Lin Li, Hsinchu (TW); Cheng-Yao Liao, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 501 days.

(21) Appl. No.: 12/068,257

(22) Filed: Feb. 5, 2008

(65) Prior Publication Data
US 2008/0247294 A1 Oct. 9, 2008

(30) Foreign Application Priority Data
Apr. 3, 2007 (CN) .................. 2007 1 0089584

(51) Int. Cl.
*G11B 7/00* (2006.01)
(52) U.S. Cl. .............. 369/103; 359/1; 359/22; 359/32; 382/100; 382/254
(58) Field of Classification Search ............. 369/103; 359/1, 22, 32; 382/100, 254
See application file for complete search history.

(56) References Cited

U.S. PATENT DOCUMENTS 7,324,249 B2 * 1/2008 Uchida et al. .......... 359/22
2005/0147013 A1 * 7/2005 Tateishi et al. .......... 369/103
2005/0286388 A1 * 12/2005 Ayres et al. ............ 369/103
2009/0238058 A1 * 9/2009 Tateishi et al. .......... 369/103

* cited by examiner

*Primary Examiner*—Wayne R Young
*Assistant Examiner*—Brenda Bernardi
(74) *Attorney, Agent, or Firm*—Bacon & Thomas, PLLC

(57) ABSTRACT

A data reading method used in a reading device for reading a holographic storage medium is provided. The holographic storage medium has several data areas. Each data area has several data pages, and each data page forms a data image that has at least one reserved block pattern on the reading device. The reserved block pattern of the data image corresponding to a first data page is searched within a first searching region to obtain a first pattern position. The reserved block pattern of the data image corresponding to a second data page is searched within a second searching region to obtain a second pattern position. A third searching position is then determined according to the first and second pattern positions. The reserved block pattern of the data image corresponding to a third data page is searched within a third searching region whose center is at the third searching position.

10 Claims, 4 Drawing Sheets

DATA READING METHOD

This application claims the benefit of People's Republic of China application Serial No. 200710089584.4, filed Apr. 3, 2007, the subject matter of which is incorporated herein by reference.

BACKGROUND OF THE INVENTION

1. Field of the Invention

The invention relates in general to holographic storage technology, and more particularly to a data reading method capable of speeding up the decoding.

2. Description of the Related Art

In holographic storage technology, a spatial light modulator (SLM) has been used mainly to encode digital data into a signal beam of light which produces bright and dark spots arranged in a two-dimensional form. The signal beam is then combined with a reference beam to generate an image of an interference pattern (a holographic image or a data page) encoding the original data. The interference pattern is recorded on a storage medium. Any sort of multi-recording method (angle multiplexing, wavelength division multiplexing, phase multiplexing, shift multiplexing, peripheral multiplexing, etc.) can be used to compactly record several data pages layer by layer on the same area (referred to as the data area below) of the storage medium. To read a specific data page, a reference beam of light, which satisfies a particular parameter, is projected onto a data area, generating the signal beam of the data page corresponding to the data area. A light sensing device acquires the signal beam creating an electronic signal which is then decoded to obtain the original digital data.

However, since the optical components inside a holographic storage system may have assembly errors or optical aberrations, an enlargement, contraction, and/or shift may occur, adversely affecting the signal beam that is received by the light sensing device. Therefore, during the encoding process, several reserved block patterns are added to a signal beam as the indicator of a data page. After the light sensing device receives the reconstructed signal image, it searches the pixel data within several pre-determined regions to calculate an accurate position of the reserved block pattern within each of the pre-determined regions and, accordingly, perform suitable image compensation. As a result, the original data on a data page can be decoded and read out correctly. However, in order to cover the reserved block pattern as widely as possible, the pre-determined region cannot be effectively reduced in size, so that the amount of calculation required cannot be reduced, and thereby, not increasing the decoding speed.

SUMMARY OF THE INVENTION

It is therefore an object of the invention to provide a data reading method for a reading device to read a holographic storage medium. A reserved block pattern reconstructed from the indicator of a data page can be effectively determined, thereby reducing the pre-determined searching region in size, further reducing the amount of calculation and speeding up the decoding.

The invention achieves the above-identified object by providing a data reading method used in a reading device that is for reading a holographic storage medium. The holographic storage medium has a plurality of data areas. Each data area has a plurality of data pages, and each data page forms a data image that has at least one reserved block pattern in the reading device. Firstly, the reserved block pattern of the data image corresponding to a first data page is searched within a first searching region to obtain a first pattern position. Then, the reserved block pattern of the data image corresponding to a second data page is searched within a second searching region to obtain a second pattern position. Next, a third searching position is determined according to the first and second pattern positions. Finally, the reserved block pattern of the data image corresponding to a third data page is searched within a third searching region whose center is at the third searching position.

The invention achieves the above-identified object by providing a data reading method used in a reading device that is for reading a holographic storage medium. The holographic storage medium has a plurality of data areas. Each data area has a plurality of data pages, and each data page forms a data image that has at least one reserved block pattern in the reading device. Firstly, some of the reserved block patterns of the data images corresponding to the data pages are searched to obtain a plurality of pattern position of the reserved block patterns. Then, a searching position is determined according to a mean value of the pattern positions. Next, the reserved block pattern of the data image corresponding to one of the data pages is searched within a searching region whose center is at the searching position.

Other objects, features, and advantages of the invention will become apparent from the following detailed description of the preferred but non-limiting embodiments. The following description is made with reference to the accompanying drawings.

DETAILED DESCRIPTION OF THE INVENTION

Although the wordings in the embodiment and the appended claims are used for naming particular components, it is to be understood that hardware manufacturers may give other name to the same component. The components in the embodiment and the appended claims are not discriminated by the difference in name but the difference in function.

Figure 1:
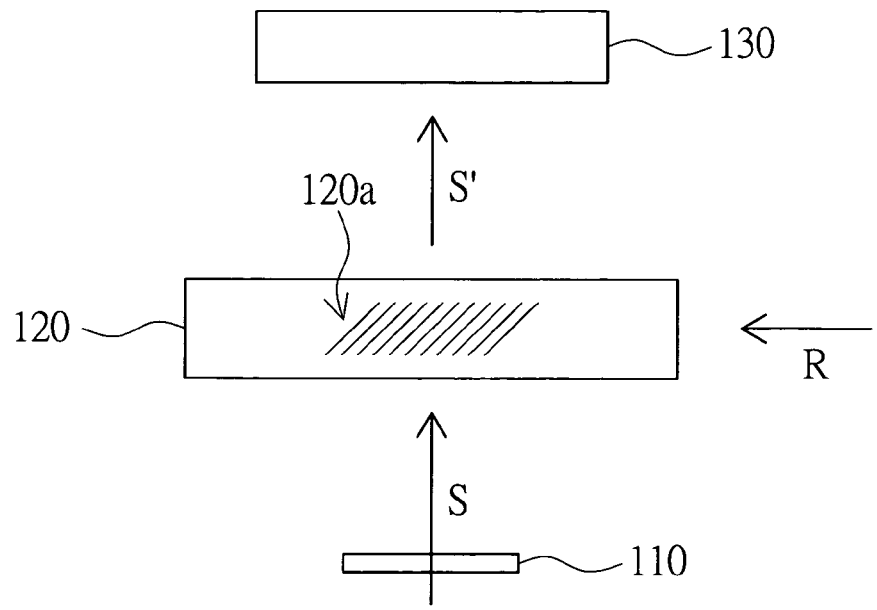
FIG. 1 is a diagram showing a holographic storage system.

FIG. 1 is a diagram showing a holographic storage system. In the holographic storage system 100, a signal light beam S from a spatial light modulator (SLM) 110 and a reference light R are projected onto a holographic storage medium 120 to form an interference image 120a. While reading from the storage medium 120, only the reference light R is projected onto the interference image 120a so as to generate a reconstructed signal light beam S' in the same direction as the original signal light beam S. A reading device 130 has an optical sensor (not shown) used to acquire the data image, which is from the reconstructed signal light beam S', on the sensing region of the optical sensor, and further processes the data image to obtain the original data carried in the signal light beam S.

Figure 2:
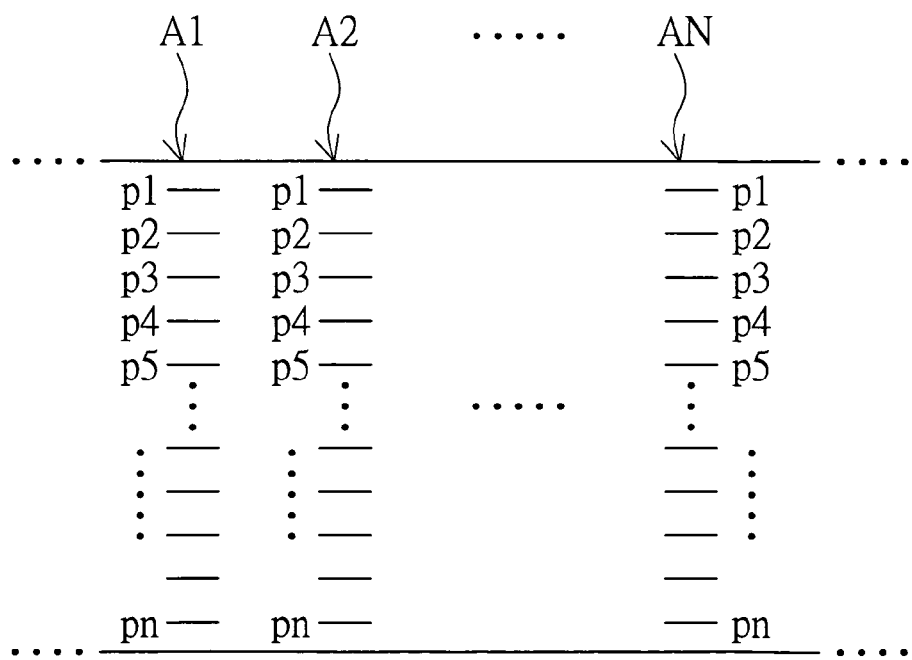
FIG. 2 shows a cross-sectional view of the holographic storage medium in FIG. 1.

FIG. 2 shows a cross-sectional view of the holographic storage medium in FIG. 1. The holographic storage medium 120 is, for example, a disk formed by an inorganic crystal, an organic polymer, or an optical polymer. The interference image 120a of the original data is a data page that is carried on the holographic storage medium 120. As shown in FIG. 2, the holographic storage medium 120 has several data areas Ai (i=1 to N where N is an integer). Each of the data areas Ai has several data pages pj (j=1 to n where n is an integer). While storing data, each of the data pages pj includes the area number of the corresponding data area, which is i, a page number, which is j, and several indicators used for decoding.

Figure 3A:
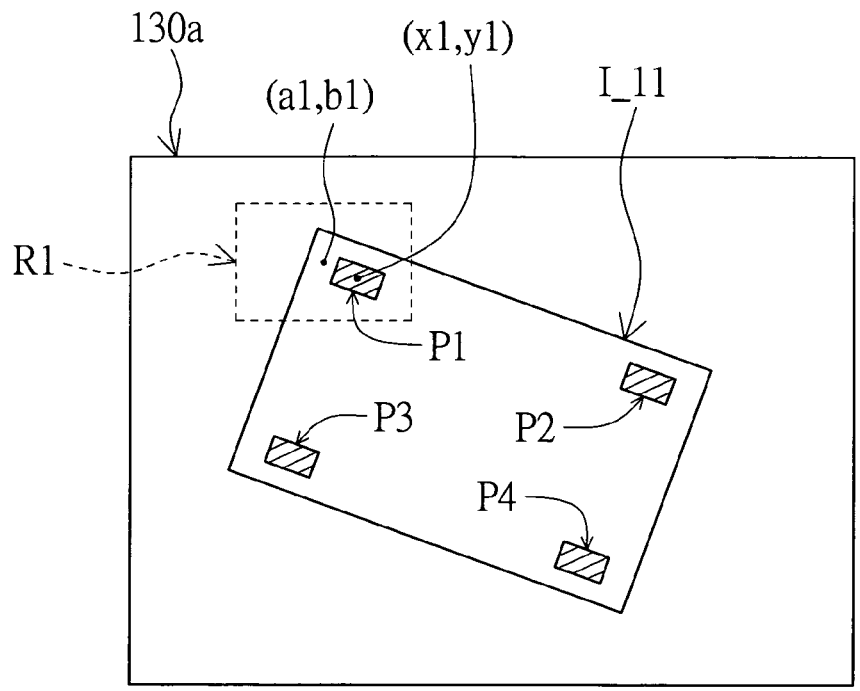
FIGS. 3A and 3B are two diagrams showing the sensing regions of the reading device in FIG. 1.
Figure 3B:
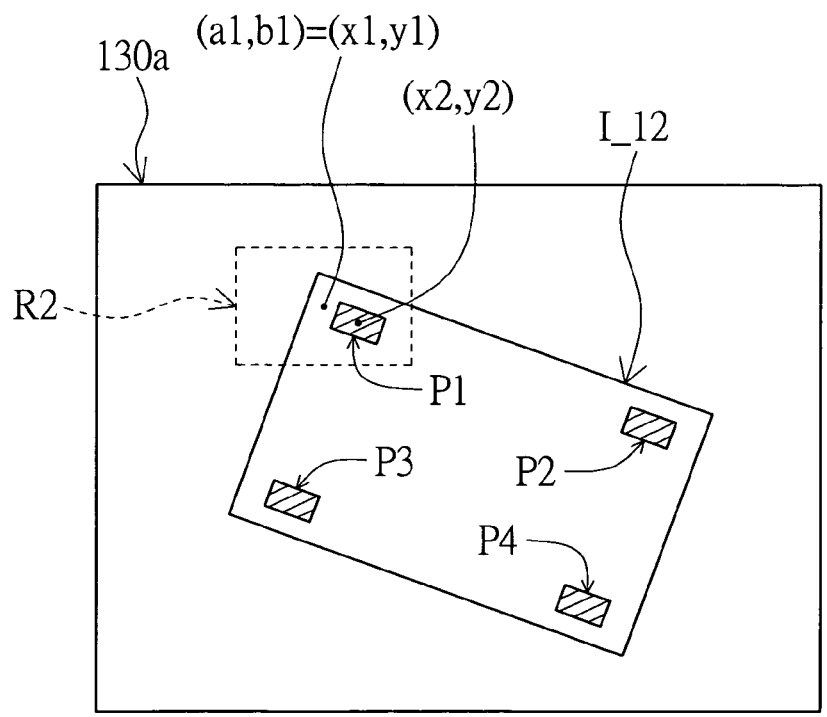

FIGS. 3A and 3B are two diagrams showing the sensing regions of the reading device in FIG. 1. The sensing region 130a is composed of several sensing pixels (not shown). As shown in FIG. 3A, when the reading device 130 reads the holographic storage medium 120, if the reference light R satisfies a particular parameter, the data image I_11 corresponding to the data page p1 of the data area A1 is formed within the sensing region 130a. The data image I_12 in FIG. 3B corresponds to the data page p2 of the data area A1. Both the data images I_11 and I_12 have four reserved block patterns P1 to P4. In the following, the reserved block pattern P1 is, for example, searched for illustrating the data reading method of the invention.

Figure 4:
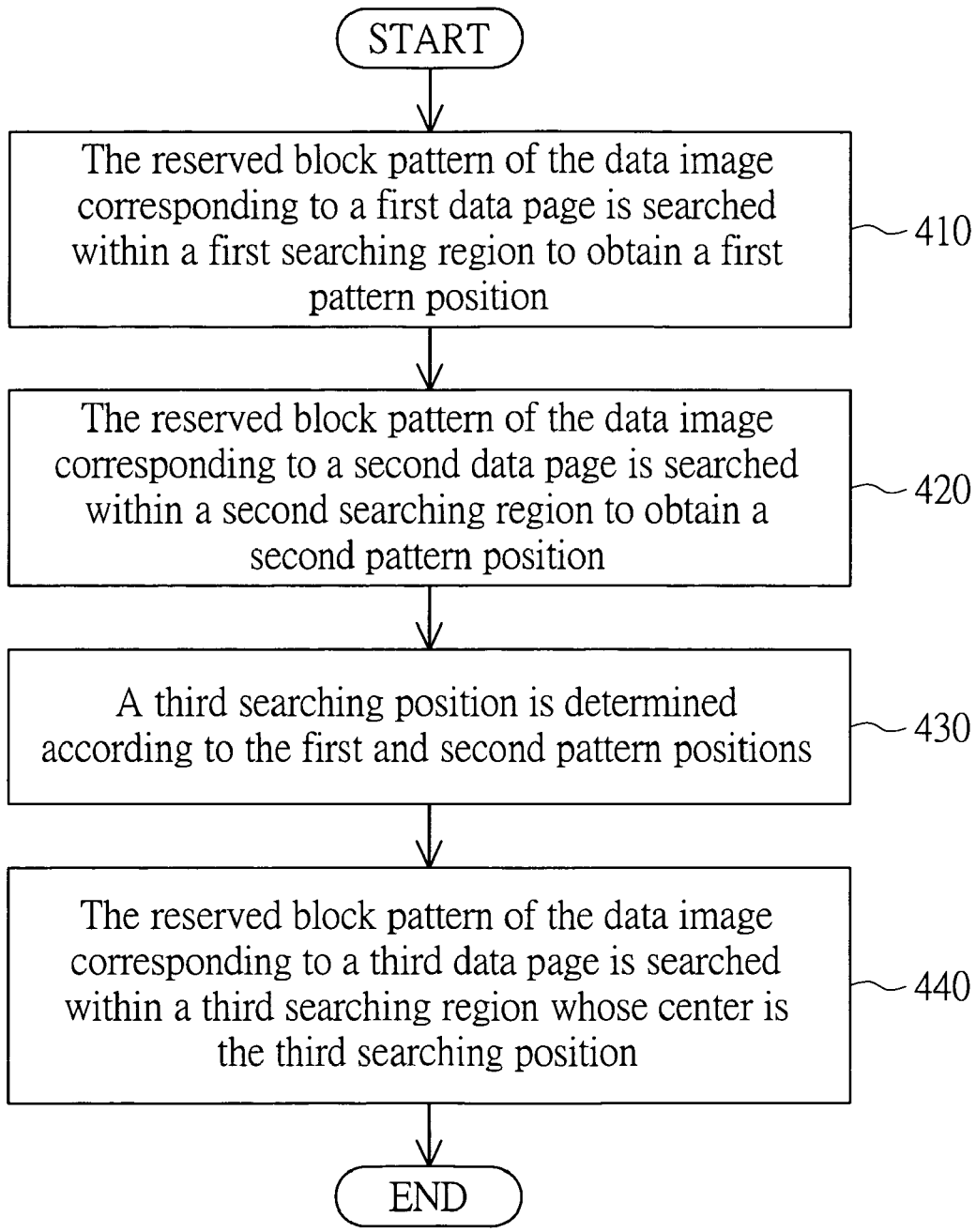
FIG. 4 shows a flowchart of the data reading method according to a first embodiment of the invention.

FIG. 4 shows a flowchart of the data reading method according to a first embodiment of the invention. In step 410, the reserved block pattern of the data image corresponding to a first data page is searched within a first searching region to obtain a first pattern position. The first data page is, for example, the data page p1 of the data area A1. In FIG. 3A, the first searching region R1 has a size of, for example, 8 by 8 sensing pixels, and a searching position (a1, b1). The coordinates within the sensing region 130a can be defined according to the distribution of the sensing pixels. A pattern position (x1, y1) of the reserved block pattern P1 on data page p1 is obtained after searching.

In step 420, the reserved block pattern of the data image corresponding to a second data page is searched within a second searching region to obtain a second pattern position. The second data page is, for example, the data page p2 of the data area A1. In FIG. 3B, the second searching region R2 has a searching position (a2, b2), which is shifted to the position (x1, y1) according to the position of the reserved block pattern P1 on data page p1. In other embodiments, the position (a2, b2) can also be equal to (a1, b1). The second searching region R2 can have a size of 8 by 8 sensing pixels, or a size of 6 by 6 sensing pixels. After searching, a pattern position (x2, y2) of the reserved block pattern P1 on data page p2 is obtained.

In step 430, a third searching position is determined according to the first and second pattern positions. After the pattern positions of the reserved block pattern P1 on two different data pages p1 and p2 are obtained, the pattern position of the reserved block pattern P1 on other data page can be estimated. In the embodiment, the pattern positions (x1, y1) and (x2, y2) are extrapolated to estimate a pattern position of the reserved block pattern P1 on a data page pj (j>2). The pattern position is calculated as (x2+[(j−2)/(2−1)]×(x2−x1), y2+[(j−2)/(2−1)]×(y2−y1))

For example, let (x1, y1)=(2, 4) and (x2, y2)=(3, 6). When j=3, the position of the reserved block pattern P1 on data page p3 is (4, 8); when j=5, the position of the reserved block pattern P1 on data page p5 is (6, 12). The estimated pattern positions are taken as searching positions within the searching regions while reading other data pages, thereby reducing the size of the searching region.

In step 440, the reserved block pattern of the data image corresponding to a third data page is searched within a third searching region whose center is the third searching region. As mentioned above, after reading data pages p1 and p2, if data page p3 is to be read, the reserved block pattern P1 on data page p3 can be searched within a searching region that has a center is at the searching position (4, 8) and a size of 4 by 4 sensing pixels. Or, if data page p5 is to be read, the reserved block pattern P1 on data page p5 can be searched within a searching region that has a center is at the searching position (6, 12) and a size of 4 by 4 sensing pixels. That is, the searching region does not remain the same (8 by 8 sensing pixels) but the reserved block pattern P1 can still be searched effectively. Also, the other three reserved block patterns P2 to P4 can be searched in the same manner. Therefore, whenever a data page is read, the area needed for searching all reserved block patterns is significantly reduced.

In addition, if in step 420, data page pn of the data area A1 is read, the pattern positions of the reserved block pattern P1 on data pages p2 to p(n−1) can be estimated by interpolating the pattern positions of the reserved block pattern P1 on the first and the last data pages. Then in step 440, the estimated pattern position can be taken as the searching position, which can be searched within a smaller searching region.

It should be noted that the two pattern positions searched in steps 410 and 420 are not limited to reading two sequential data pages. For example, the pattern positions of data pages p1 and p2 are used to search the reserved block pattern P1 on data page p3. Then, for data page p5 the pattern positions of data pages p1 and p2 can be used to estimate the searching position, and the pattern positions of data pages p2 and p3 can also be used. In other words, as long as the pattern positions of any two data pages have been obtained, interpolation or extrapolation can be applied in step 430. In other embodiments, if the page numbers of the data pages to be read are close, a mean value of the pattern positions can also be used for the search.

Moreover, the two data pages used in steps 410 and 420 can be located in different data areas. For example, data page p1 located in the data area A1 is processed in step 410 to get one pattern position, and data page p1 located in the data area Ai (i>1) is processed in step 420 to get another pattern position. At this time, the pattern position of the reserved block pattern on data page p1 in another data area can also be estimated by interpolation or extrapolation.

Figure 5:
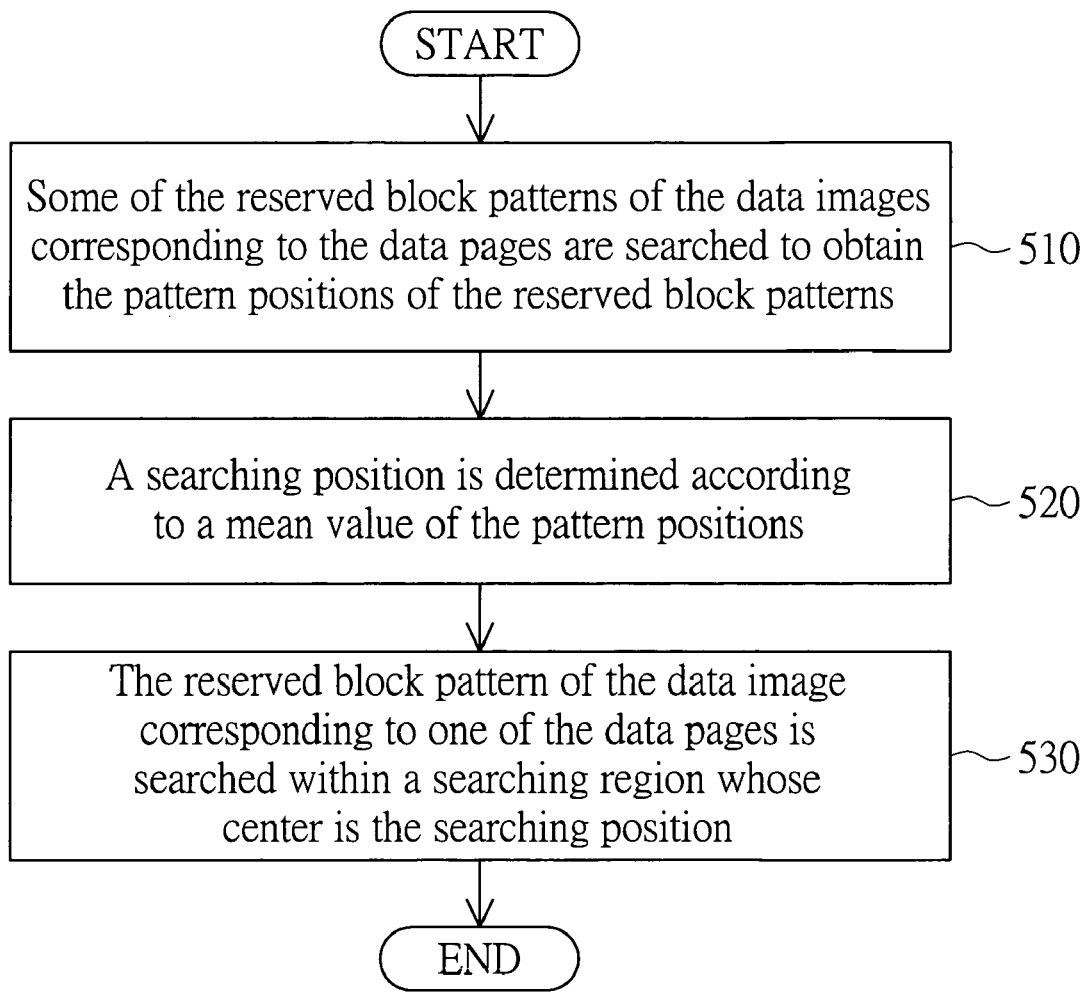
FIG. 5 shows a flowchart of the data reading method according to a second embodiment of the invention.

FIG. 5 shows a flowchart of the data reading method according to a second embodiment of the invention. In step 510, some of the reserved block patterns of the data images corresponding to the data pages are searched to obtain the pattern positions of the reserved block patterns. In the second embodiment, any method can be adopted to search several pattern positions. For example, six pattern positions (Xk, Yk), k=1 to 6, of the reserved block pattern P1 on data pages p1 to p6 in the data area A1 are obtained according to the method used in the first embodiment. If the distribution of the six pattern positions has a large variation, the number of samplings of the pattern positions can be increased.

In step 520, a searching position is determined according to the mean value of the pattern positions. That is, the position ([ΣXk]/6,[ΣYk]/6]) is taken as the searching position within the searching region when other data pages are subsequently read.

In step 530, the reserved block pattern of the data image corresponding to one of the data pages is searched within a searching region whose center is the searching position. The position ([ΣXk]/6,[ΣYk]/6]) is an estimated pattern position of the reserved block pattern P1 on data pages p7 to pn in the data area A1. Therefore, as data pages p7 to pn are read, the searching region for searching the reserved block pattern P1 can be smaller than that used for the search in step 510. The amount of calculation needed for searching the reserved block pattern while reading the data page is significantly reduced. The other three reserved block pattern P2 to P4 can be searched in the same manner and are not elaborated here again.

The data reading method disclosed above effectively estimates the pattern position of the reserved block pattern reconstructed from the indicator of the data page. The pattern position is regarded as the center position within a searching region, so that the size of the pre-determined searching region is reduced, thereby reducing the amount of calculation required and speeding up the decoding when a reading device reads a holographic storage medium, While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data reading method used in a reading device that is for reading a holographic storage medium having a plurality of data areas, each of the data areas having a plurality of data pages, each of the data pages forming a data image that has at least one reserved block pattern in the reading device, comprising:
    (a) searching the reserved block pattern of the data image corresponding to a first data page within a first searching region so as to obtain a first pattern position of the reserved block pattern;
    (b) searching the reserved block pattern of the data image corresponding to a second data page within a second searching region so as to obtain a second pattern position of the reserved block pattern;
    (c) determining a third searching position according to the first pattern position and the second pattern position; and
    (d) searching the reserved block pattern of the data image corresponding to a third data page within a third searching region whose center is at the third searching position.

2. The method according to claim 1, wherein the first data page, the second data page, and the third data page are located in the same data area, the page number of the third data page is between that of the first data page and that of the second data page, and in the step (c) the third searching position is obtained by interpolating the first pattern position and the second pattern position.

3. The method according to claim 1, wherein the first data page, the second data page, and the third data page are located in the same data area, the page number of the third data page is outside the range between the page number of the first data page and that of the second data page, and in the step (c) the third searching position is obtained by extrapolating the first pattern position and the second pattern position.

4. The method according to claim 1, wherein the area number of the data area that the third data page is located is between that of the first data page and the second data page, and in the step (c) the third searching position is obtained by interpolating the first pattern position and the second pattern position.

5. The method according to claim 1, wherein the area number of the data area that the third data page is located is outside the range between the area number of the data area that the first data page is located and that of the second data page, and in the step (c) the third searching position is obtained by extrapolating the first pattern position and the second pattern position.

6. The method according to claim 1, wherein in the step (c) the third searching position is determined according to a mean value of the first pattern position and the second pattern position.

7. The method according to claim 1, wherein the second searching region is substantially smaller than the first searching region.

8. The method according to claim 1, wherein the third searching region is substantially smaller than or equal to the first searching region or the second searching region.

9. The method according to claim 1, wherein a second searching position of the second searching region is the same as a first searching position of the first searching region.

10. A data reading method used in a reading device that is for reading a holographic storage medium having a plurality of data areas, each of the data areas having a plurality of data pages, each of the data pages forming a data image that has at least one reserved block pattern in the reading device, comprising:
    (a) searching a part of the reserved block patterns of the data images corresponding to the data pages so as to obtain a plurality of pattern position of the reserved block patterns;
    (b) determining a searching position according to a mean value of the pattern positions; and
    (c) searching the reserved block pattern of the data image corresponding to one of the data pages within a searching region whose center is at the searching position.

* * * * *